(No Model.)  6 Sheets—Sheet 1.

J. NORTH.
MACHINE FOR MAKING SPIKES.

No. 343,839.  Patented June 15, 1886.

Fig. 1.

Witnesses.
Robert Everett.
J. A. Rutherford

Inventor:
John North.
By James L. Norris, Atty.

(No Model.) 6 Sheets—Sheet 2.

J. NORTH.
MACHINE FOR MAKING SPIKES.

No. 343,839. Patented June 15, 1886.

(No Model.)   6 Sheets—Sheet 4.

J. NORTH.
MACHINE FOR MAKING SPIKES.

No. 343,839.   Patented June 15, 1886.

Witnesses  
Inventor:  
John North.  
By James L. Norris.  
Atty.

(No Model.)  6 Sheets—Sheet 5.

J. NORTH.
MACHINE FOR MAKING SPIKES.

No. 343,839. Patented June 15, 1886.

Witnesses.  
Robert Swett  
J. A. Rutherford

Inventor:  
John North  
By James L. Norris.  
Atty.

(No Model.)  6 Sheets—Sheet 6.

J. NORTH.
MACHINE FOR MAKING SPIKES.

No. 343,839. Patented June 15, 1886.

Witnesses
Robert Errett
J. A. Rutherford

Inventor
John North.
By James L. Norris.
Atty.

N. PETERS. Photo-Lithographer, Washington, D. C.

UNITED STATES PATENT OFFICE.

JOHN NORTH, OF MIDDLETOWN, CONNECTICUT.

MACHINE FOR MAKING SPIKES.

SPECIFICATION forming part of Letters Patent No. 343,839, dated June 15, 1886.

Application filed October 28, 1885. Serial No. 181,172. (No model.)

*To all whom it may concern:*

Be it known that I, JOHN NORTH, a citizen of the United States, residing at Middletown, in the county of Middlesex and State of Connecticut, have invented new and useful Improvements in Machines for Making Spikes, of which the following is a specification.

This invention relates to a machine for making hook-headed spikes, such as are employed in connecting railroad irons and ties and for other analogous purposes, and by means of which a heated "spike-rod" or bar is severed into suitable lengths or "blanks" that are tapered, pointed, and headed by a continuous series of operations, whereby the spikes are completely and perfectly finished and made ready for use without requiring any subsequent manipulation.

My improved spike-making machine comprises a continuously-operating mechanism for feeding, rolling, pointing, and tapering the spike-blanks, and a "reciprocating die-holder and blank-carrier" for conveying the said blanks to the head-forming dies, said devices being employed in combination with a cored guide-block which supports the blank while it is subjected to the action of the rolling and pointing mechanism and delivers it to the reciprocating holder or carrier, provision being made for clearing the path of the blank and removing any obstacle to its progress, and also for imparting a preparatory bend to its head end just before the hook-shaped head is formed by the appropriate dies.

The invention consists in certain novel combinations of devices for preparing the spike-blank, for locking it in the reciprocating carrier, for giving a preliminary bend to its head end, and for releasing the spike after its head is formed, all of which will be hereinafter particularly pointed out, and defined in the claims.

In the annexed drawings, illustrating the invention.

Figure 1:
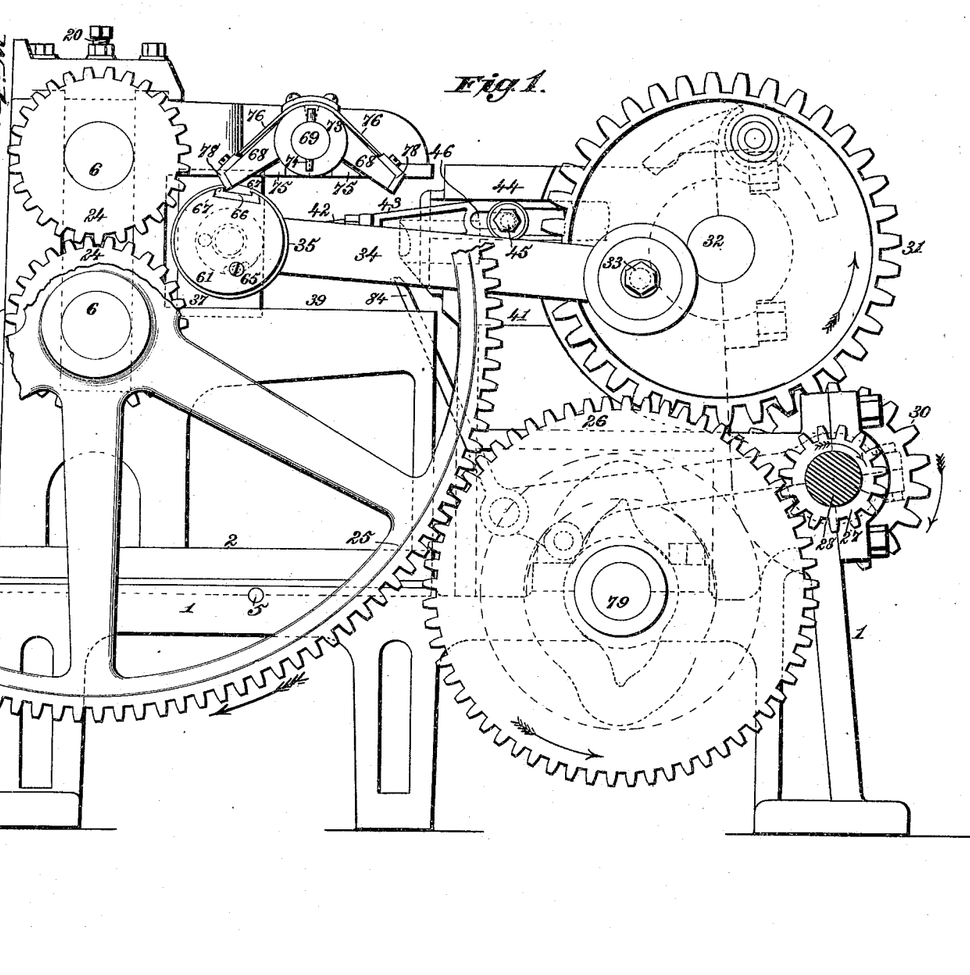
Figure 1 is a side elevation of a spike-machine embodying my improvements.
Figure 3:
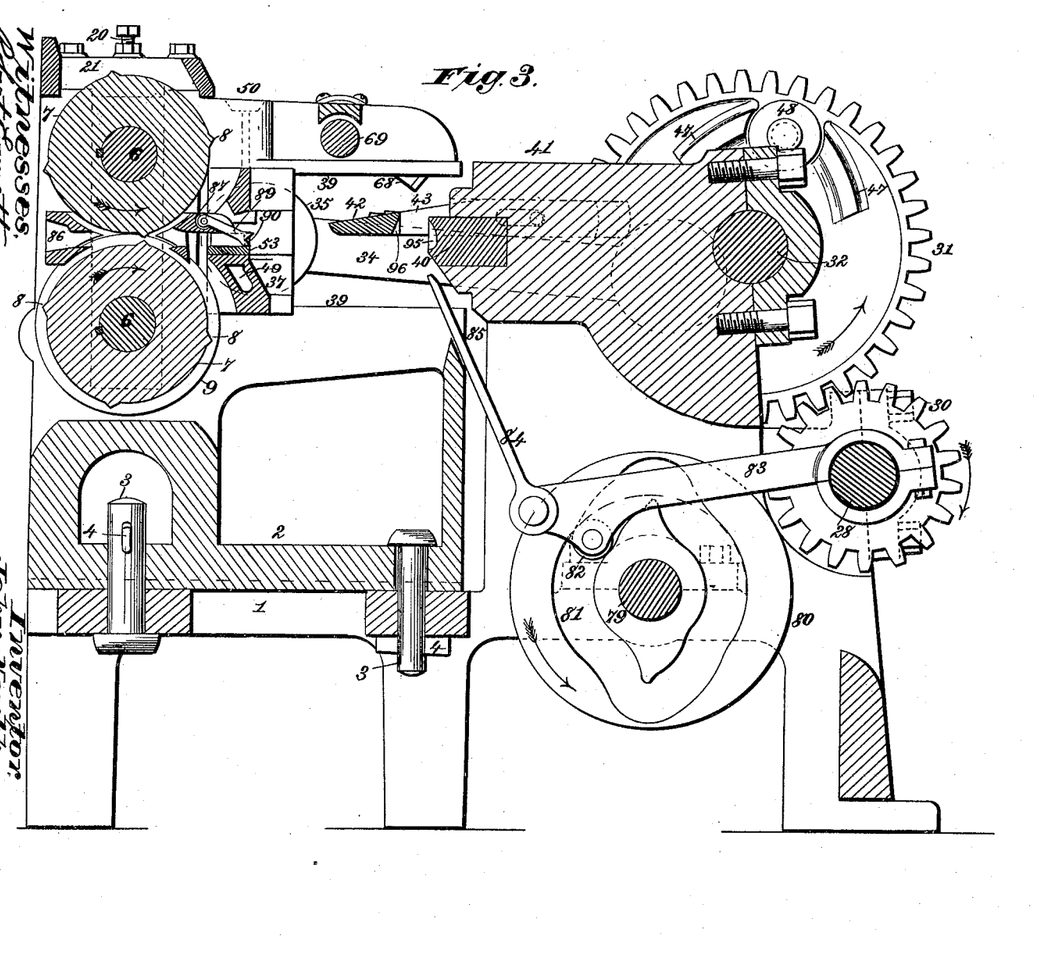
Fig. 3 is a vertical longitudinal section on the line 3 3 of Fig. 2, the reciprocating die-holder and blank-carrier being shown in proximity to the feeding and pointing rolls and the guide-block and clearer, and in position to receive a spike-blank.

Referring to these drawings, the numeral 1 designates the main frame of the machine, in one end of which is supported a removable supplemental frame, 2, that is held in place by means of the bolts 3 and keys 4, as shown in Fig. 3, and by a dowel-pin, 5—one on each side, and inserted partly in each frame, as seen in Fig. 1.

Figure 5:
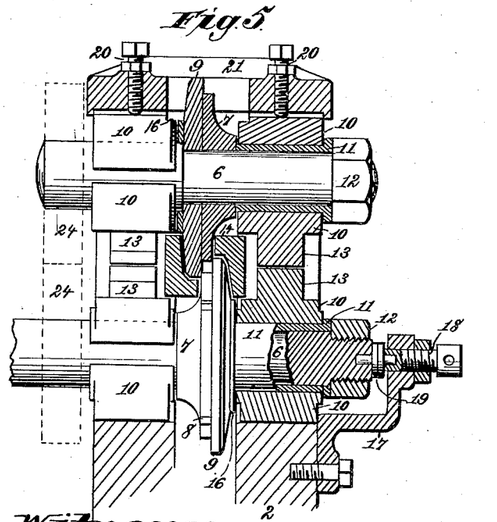
Fig. 5 is a detailed view of the rolling, pointing, and guiding mechanism, partly in section on the line 5 5 of Fig. 2.

The frame 2 affords bearings for the shaft 6 of the feeding and pointing rolls 7, which are keyed thereto, as shown in Fig. 3. For the purpose of making a plain-faced spike that is tapered a portion of its length, both the upper and lower rolls, 7, will be provided with a smooth periphery or tread, broken at suitable intervals by cutting and pointing dies or teeth 8, for severing the bar or rod into spike-blanks having pointed or beveled ends. It will be seen that about one half the space between the several dies 8 is formed on a true circle, the remaining portion being of gradually-increasing diameter, thus tapering the spike-blank from about its center to its point end. These rolls have on one side a flange, 9, and are so arranged on their respective shafts, as shown in Fig. 5, that said flanges will serve to prevent lateral displacement of the blank.

If it is desired to make a longitudinally-grooved spike, one of the feeding and pointing rolls may be replaced by a roll having a circumferential groove provided with a convexed bottom, as shown in my Patent No. 303,945.

Figure 6:
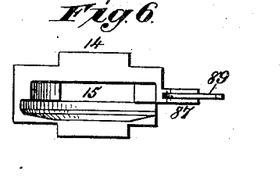
Fig. 6 is a plan or top view of the cored guide and clearer.

The feed-roll shafts 6 are supported in divided boxes 10, with interposed wear-sleeves 11, flanged at one end, and are held in place by nuts 12, as usual. By reference to Fig. 5 it will be seen that the lower side of each upper journal-box and the upper side of each lower box are so formed with contacting shoulders 13 as to prevent the rolls 7 from coming together, thereby avoiding strain of their actuating-gears. This construction also affords space for the support of what I term a "guide-block and clearer," 14, which has a longitudinal passage for the spike-blank, and is cored, as shown in Figs. 5 and 6, on its upper and lower surfaces at 15, to permit the passage of the rolls where they are most nearly in contact. This guide and clearer device promotes several important purposes, and will be presently more fully described.

On each of the sleeves 11, at the flanged side of each roll 7, is a wear-collar, 16, of tempered steel or other suitable material. A bracket, 17, is secured to one side of the frame 2, and carries an adjusting-screw, 18, in the inner end of which is inserted a wear-button, 19, that contacts with a similar button inserted in the end of the lower roll-shaft. By means of this screw 18 the lower roll is adjusted to proper relation with the upper roll for taking up any slight wear. The upper journal-boxes are provided with the usual adjusting-screws, 20, supported in a cap-piece, 21, which is bolted or otherwise secured to the frame 2 in any suitable manner. By detaching this cap-piece the shafts 6, with their rolls 7 and accompaniments, may be readily removed for renewal or repair.

Figures 13, 14:
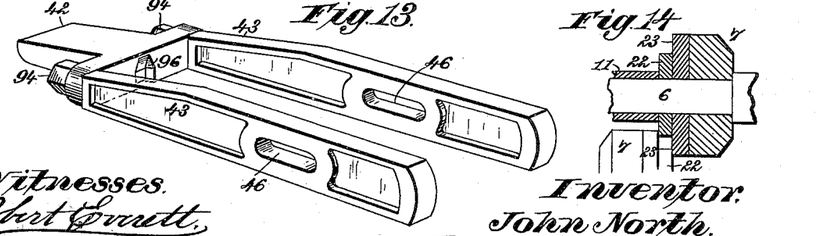
Fig. 13 is a perspective view of the movable heading-die with its supporting-arms.
Fig. 14 shows a modification of the construction of the feeding and pointing rolls.

If desired, the feeding and pointing rolls 7 can be made in two or more parts, to lessen the cost of repair and facilitate the removal of worn parts. In Fig. 14 is shown a modified construction of roll, especially designed for this purpose, the steel collars 22 and 23, forming the wearing portions of said roll, being so arranged as to admit of easy replacement, or the larger collar, 23, which forms the wearing side of the flange, can be turned when one side is worn down, and thereby present a new wearing-surface.

The shafts of the two feeding and pointing rolls are geared together by means of spur-wheels 24, so as to rotate in opposite directions and at the same rate of speed. On one of these roll-shafts is a large spur-wheel, 25, which is driven by a smaller spur-wheel, 26, that in turn is driven by a pinion, 27, on the main driving-shaft 28, which has a pulley, 29, through which the machine is actuated by belting from a prime motor. The driving-shaft 28 carries two spur-wheels, 30, which engage with two larger spur-wheels, 31, on a transverse shaft, 32, having bearings in the upper part of the machine-frame. These spur-wheels 31 are placed a suitable distance apart, and on the outer side of each is a wrist-pin, 33, for attachment of the pitman-rods or links 34, which are provided at their other ends with eyes 35, that are hung on trunnions or tubular projections 36 of a hollow reciprocating die-holder and blank-carrier, 37, having top and bottom seats, 38, by which it is adapted to move along stationary guideways 39 of the supplemental frame. It will be seen that the movable die-holder and blank-carrier 37 is thus capable of sliding forward and back between the feeding and pointing rolls 7 and a stationary spike-heading die, 40, on the end of an abutment, 41, which forms part of the main frame. This reciprocating movement of the die-holder and blank-carrier 37 is affected by means of the spur-wheels 31 and connecting-links 34, above mentioned.

Figure 2:
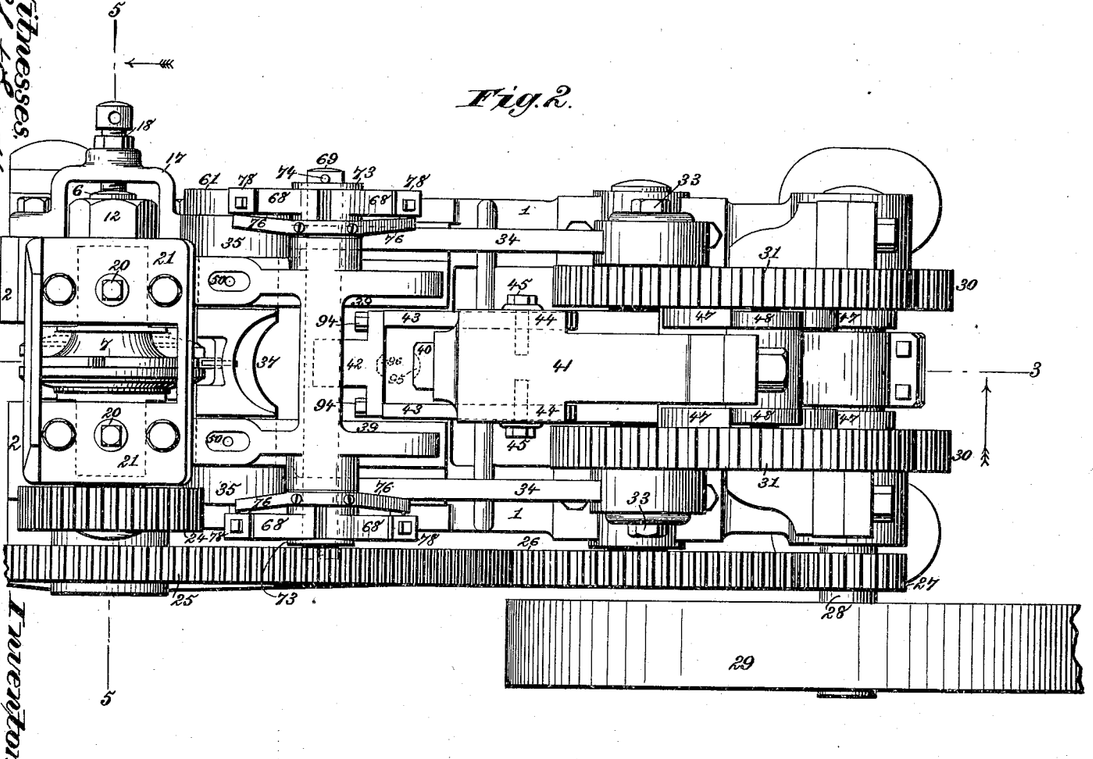
Fig. 2 is a plan or top view of the same.
Figure 4:
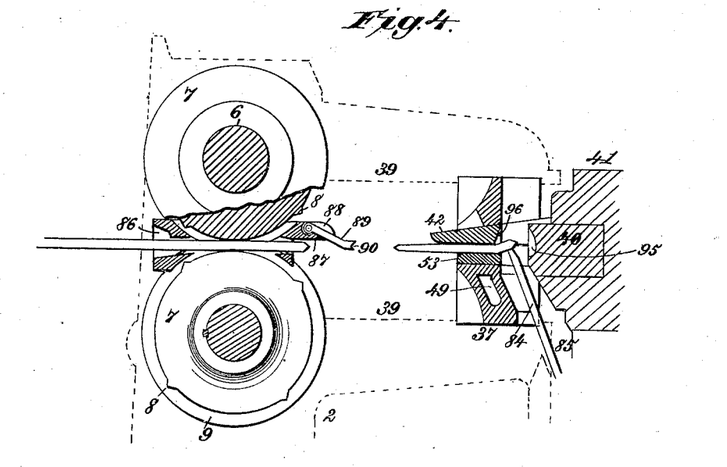
Fig. 4 is a sectional detail view showing the reciprocating die-holder and blank-carrier engaged with the movable heading-die and nearly in contact with the stationary heading-die, also showing the action of the device for bending the head end of the spike-blank.

The stationary heading-die 40 is employed in connection with a movable heading-die, 42, which also acts as a wedge to assist in holding the spike-blank in contact with the dies carried by the holder or carrier 37, as shown in Fig. 4. One end of the movable heading-die 42 is flanged or shouldered, as shown in Figs. 2 and 13, for attachment to its horizontal supporting-arms 43. These arms slide in guideways 44 in the sides of the abutment 41, that also supports the fixed heading-die. The reciprocating movement of the movable heading-die 42 is limited by means of removable pins or studs 45, passed through slots 46 in each arm 43, and inserted into the sides of the abutment. This movable heading-die 42 is projected or moved outward by means of fixed cams 47 on the inner side of each spur-gear 31, said cams being arranged on each side of an intervening cam-roller, 48, that is journaled to each of said gears. The cam-surfaces 47 are so curved, as shown in Fig. 3, that as the gears 31 rotate forward said cams are brought in contact with the free ends of the sliding arms 43, so as to force them gradually outward without any percussive action. When the movable wedge-shaped heading-die 42 has been thus carried forward in position to meet the reciprocating die-holder and blank-carrier 37 on the return movement of the latter with a spike-blank from the feed-rolls, the gears 31 will have rotated sufficiently to bring the cam-rollers 48 in contact with the ends of the slide-arms 43, on which they exert such pressure as to force the die 42 into the holder or carrier 37, and in wedging contact with the gripping-dies and spike-blank contained therein. By thus interposing a roller, 48, in each cam-surface of the gears 31 at the point where the greatest force is to be exerted upon the die-supporting arms 43 the die 42 carried by said arms is enabled to effect its work of locking the spike-blank from vertical displacement in the reciprocating carrier 37 without injurious strain upon the actuating mechanism, and owing to the sliding pressure of the rollers 48 they are saved from wear.

The reciprocating die-holder and blank-carrier 37 is recessed concavely on its front and rear faces, as shown in Figs. 3 and 4, to allow it to come into sufficiently close contact with the peripheries of the feeding and pointing rolls 7 and the die-carrying end of the abutment 41, respectively. It is also made hollow at each end and in its lower portion to form a continuous water way or chamber, 49, for the passage of a cooling or lubricating medium, which is supplied through a funnel and tube, 50, on each side of the machine-frame at the top, as shown in Figs. 2 and 3. This water-way communicates with the under sides of the gripping-dies 51, as shown by dotted lines in Fig. 7.

Figure 7:
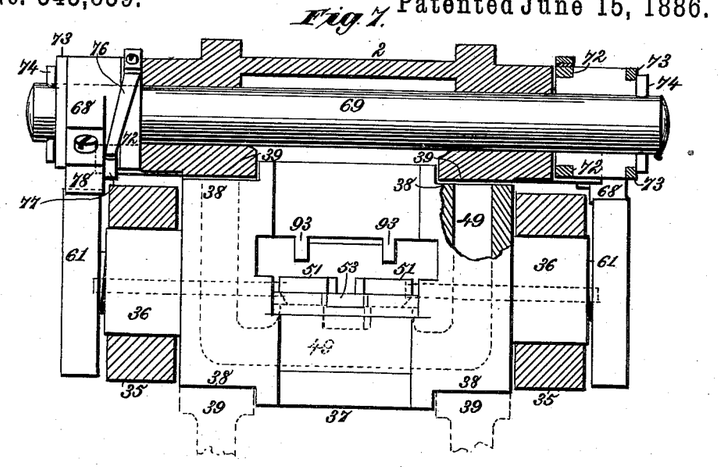
Fig. 7 is a transverse section of a portion of the machine-frame with the reciprocating die-holder and blank-carrier in end elevation.
Figure 8:
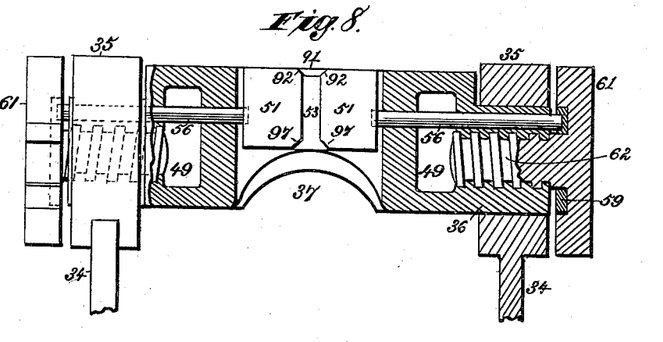
Fig. 8 is a horizontal section of the reciprocating die-holder and blank-carrier with the gripping-dies in position.
Figure 9:
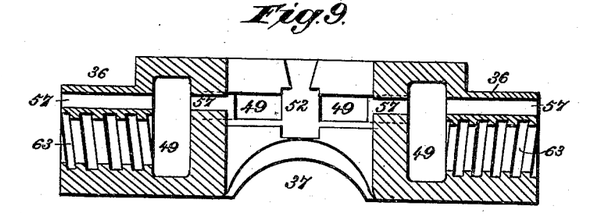
Fig. 9 is a similar view with the gripping-dies and die-bed removed.
Figure 10:
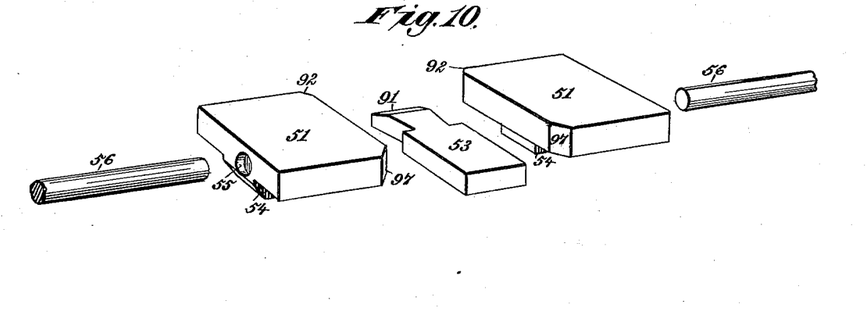
Fig. 10 is a perspective view of the detachable die-bed, gripping-dies, and push-rods.
Figure 11:
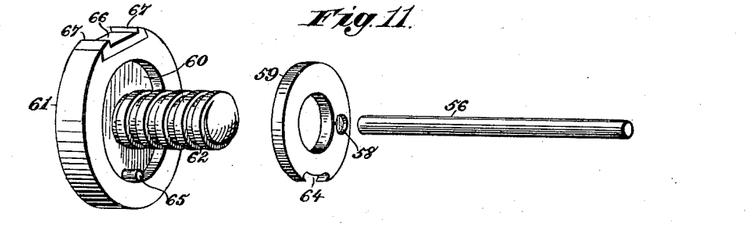
Fig. 11 is a perspective view of one of the ratchet-disks with push-rod and ring-connection.
Figure 12:
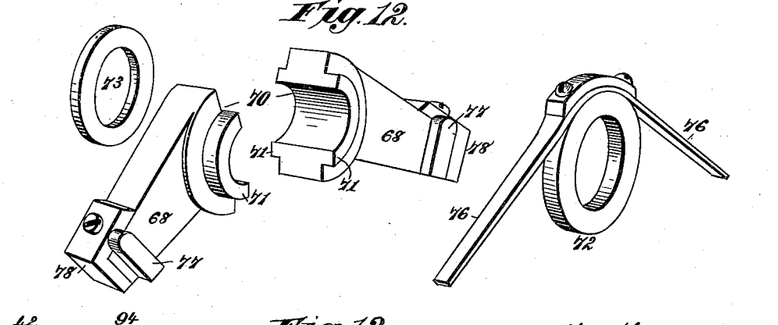
Fig. 12 is a perspective view of the pawls and their connections, for actuating the above-mentioned ratchet-disks and push-rods.

The lower central portion of the holder and carrier 37 is recessed, as shown in Fig. 9, and has a cavity or depression, 52, that extends centrally from front to rear, and is partly rectangular or oblong and partly in the form of a keystone, to receive a correspondingly-formed bed-piece, 53, the shape of which is shown in Fig. 10. When this bed-piece 53 is in position in the cavity or recess 52, it engages therewith, so as to be securely locked from lateral or endwise displacement. The gripping-dies 51 overlap this bed-piece or die-bed 53 on each side, as shown in Figs. 7 and 8, and each gripping-die is provided on the under side with a projecting portion or tail, 54, which enters the recessed portion of the holder or carrier 37 on each side of the stationary bed-piece 53 and immediately above the open central portion of the water-chamber. These downward projections 54 have a width from front to rear sufficient to engage the recessed portion of the carrier 37 in such a manner as to prevent endwise displacement of the gripping-dies. These dies and their projections 54 are so proportioned, however, as to be capable of lateral adjustment for gripping and releasing the spike-blanks. In the outer side of each gripping-die 51 is a seat, 55, for the end of a push-rod, 56, which passes through a cylindrical opening, 57, in each trunnioned end of the die-holder and blank-carrier. The outer end of each push-rod 56 is seated at 58 in a ring, 59, Figs. 8 and 11, which is received in a recess, 60, formed in one side of a ratchet-disk, 61, that carries a screw-threaded shank, 62, which enters an internally-threaded opening, 63, in the trunnions 36. On the outer edge of the ring 59 is an elongated notch, 64, that engages a screw-headed pin, 65, which is passed through the recessed disk 61. The periphery of this shanked disk 61 is provided with an elongated recess, 66, having a ratchet projection, 67, at each end. These ratchet projections are adapted to be engaged with pawls 68, by which the disks 61 and attached screw-stems 62 are rotated in one direction to push the rods 56 inward and lock the gripping-dies in contact with a spike-blank, and also to rotate said disks and screw-stems in the opposite direction to release the said dies and blank, as hereinafter explained. The pawls 68 are mounted in pairs at each end of a shaft, 69, having suitable bearings in an overhanging upper portion of the supplemental frame. Each pawl is formed at one end with a nearly semi-cylindrical portion, 70, having a semi-circular flange or shoulder, 71, Fig. 12, on each side. The adjacent ends of the pawls so formed are adapted to very nearly meet around the shaft 69, and are held thereon by a spring-carrying ring, 72, fitted over the flanges or shoulders 71 on one side, and by a washer, 73, on the correspondingly-shouldered opposite side, said washer being secured by a key, 74, inserted in the pawl-supporting shaft. The pawls 68 project downward and outward in opposite directions, or away from each other, as shown in Fig. 1, and are supported in this downward-inclined position by means of inclined stops or lugs 75 on the upper part of the frame. Each pawl is held down in this position partly by its weight and partly by a spring, 76, attached to the ring 72, the ends of said springs being made to rest on lugs 77, near the outer ends of said pawls. The bearing ends of the pawls have tempered or hardened steel faces 78, to engage the similarly-formed faces of the ratchet-recesses 66, with which they engage, said parts being detachable, to permit of removal and replacement when necessary.

On the shaft 79 of the spur-wheel 26 is fitted a disk, 80, having a cam-groove, 81, which receives a roller, 82, carried by an arm, 83, one end of which is loosely mounted on the main shaft 28, as shown in Fig. 3. This cam disk 80 imparts a vertical oscillation to the arm 83, to the forward end of which is pivoted a vertically-inclined reciprocating bar, 84, that extends upward and forward through a slot or opening, 85, between the frame 2 and abutment 41. The object of the pivoted bar 84 and its actuating mechanism is to provide a simple and effective means for giving direction to the hook or bend that is to be partly formed on the end of the spike-blank preparatory to swaging its head into shape with the head-forming dies.

It will be seen that the contour of the cam-groove 81 is such as to cause the bar 84 to be carried up steadily and in proper position between the stationary heading-die 40 and approaching die-holder and blank-carrier 37 to deliver a well-directed blow against the under side of the adjacent projecting end of the blank, thereby bending it upward, as shown in Fig. 4, after which the continued rotation of the cam causes the bar 84 to be retracted rapidly, so as not to interfere with the proper action of the heading-dies. By thus making provision for imparting a bend to the end of the blank while it is held by the gripping-dies, and immediately before the swaging action of the head-forming dies, all possibility of the blank becoming unseated by the impact of the heading-dies is avoided, and the spike is given a well-made head of the proper hooked form, as desired.

The spike-rod, which is to be presented to the machine in a heated condition, is received by a flaring guide-opening, 86, in the forward end of the cored guide block and clearer 14, through which it is passed under the action of the feeding and pointing rolls 7, which not only sever the rod at intervals into spike-blanks of suitable length, but likewise impart to said blanks a partial longitudinal taper. By the action of these rolls also the severed blank is fed into the reciprocating die-holder and blank-carrier 37, where said blank is received upon the stationary die-bed 53, and between the movable gripping-dies 51. The discharge end of the guide-block and clearer 14 projects sufficiently beyond the discharge side of the rolls 7 to prevent the severed spike-blanks from being carried around by said rolls. On the discharge end of the cored block 14 is a horizontally-projecting nose, 87, having a longitudinal inclined trough or groove, 88, in which is pivoted a clearing-dog, 89, that projects downward and outward, as shown in Figs. 3 and 4, and with its lower edge in line with the upper surface of the bed-plate 53 in the reciprocating carrier. The end of this dog is notched at 90 to engage the point end of a spike-blank and eject said blank from the carrier 37, in case the blank should be too short or fail to receive a head by reason of being misplaced in the carrier.

By reference to Fig. 3 it will be seen that when the die-holder and blank-carrier 37 is in close proximity to the feeding and cutting rolls 7 the nose-piece 87 will project into the carrier, and the dog 89 will rest on the bed 53, the entrance end of which is beveled at 91, as clearly shown in Fig. 10, for the purpose of facilitating its passage beneath the dog 89 without catching, and also to facilitate the entrance of the spike-blank as delivered from the rolls.

It is obvious that the form and location of the block 14 and its pivoted dog 89, as described, are such as to provide effectively for guiding the spike-rod into position between the rolls 7. It also supports said rod while being severed, guides the severed blank properly to the discharge side of the rolls, prevents it from dropping out of place or being carried around by said rolls, and delivers it to the gripping-dies of the reciprocating carrier in proper season and position, the dog 89 having previously cleared the way, if necessary, by ejecting from the carrier any imperfectly-formed spike that may have been retained therein.

When a spike-blank is discharged from the guide-block 14, the latter passes beneath the pivoted dog 89 and occupies its appropriate position within the carrier 37 and between the gripping-dies 51, the corners of which are beveled, as shown at 92 in Figs. 8 and 10, to avoid obstructing the entrance of said blank. As soon as the blank is thus in position, with a portion projecting at each end from between the dies 51, the rotation of the gears 31 will cause the links 34 to draw the holder and carrier 37 toward the heading-dies. This movement immediately brings the ratchet projections 67 in contact with the ends of the adjacent pawls 68, thereby causing the two disks 61 to rotate toward the rolls 7 until the studs 65 come in contact with the upper ends of their respective notches 64 in the rings 59 and move the respective screw-shanks 62 inward within the internally-threaded openings 63 of the trunnions 36. This slight rotation of the disks 61 obviously causes them to move inward with their screw-shanks 62 sufficiently to impart an end-thrust to the push-rods 56, and thereby force the gripping-dies 51 into close and firm contact with the interposed spike-blank, in which position it is securely locked by the engagement of the screw-shanks 62 within the internally-threaded trunnions of the carrier. The rotation of the disks 61 also frees them from engagement with the pawls 68 and enables the carrier 37 to move on toward the heading-dies. When the carrier 37 has traveled far enough to meet the movable heading-die 42, the gears 31 will have rotated sufficiently to bring their cams 47 and cam-rollers 48 into action for the purpose of forcing the movable wedge shaped die 42 into said carrier above the spike-blank and its gripping-dies.

By reference to Figs. 3 and 4 it will be seen that the upper wall of the opening in the carrier 37 is inclined inward, to correspond with the upper inclined faces of the die 42 and its supporting-arms 43, and in Fig. 2 it will be seen that the width of this opening is sufficient to admit the die 42 between the guide lugs or ribs 93, while the spaces on the outer sides of these lugs or ribs admit the nuts 94, that secure the die 42 to its supporting-arms. The movable heading-die 42 being now wedged into the carrier 37, so as to securely lock the spike-blank from vertical displacement, the continued rotation of the gears 31 will gradually relax the pressure of the cams 47 and allow the arms 43 to move backward in their guideways, thus permitting the carrier 37 and movable heading-die 42 to approach the stationary heading-die 40. While the spike-blank is still locked in the carrier 37, and before the heading-dies come together, the cam-disk 80 and oscillating arm 83 will carry the bar 84 upward, and cause it to deliver a blow against the under side of the projecting end of the blank, thereby bending it upward, as shown in Fig. 4. The bend thus formed on the enlarged end of the blank determines the direction in which the hook-shaped head will be swaged by the heading-dies, and insures the formation of a perfect head when the said dies come together. This preparatory bend also forms a shoulder on the upper side of the blank sufficient to prevent any endwise displacement thereof when the heading-dies are brought into forcible contact. Having thus accomplished its purpose, the bar 84 is retracted rapidly by the continued rotation of its actuating-cam. Then the carrier 37 approaches the abutment 41 closely, the heading-dies 40 and 42 come forcibly together, and the head of the spike is swaged in the die-cavities 95 and 96 of the stationary and movable heading-dies, respectively, and by the beveled corners 97 of the gripping-dies. When the carrier is in the act of approaching the fixed heading-die 40, the disks 61 are enabled to pass beneath the adjacent pawls 68, by reason of said pawls being so formed and arranged as to rise under pressure exerted against their inner sides. When the carrier 37 is on its return movement, however, after the formation of the spike-head, the ratchet projections 67 will come into engagement with the outer edges of the pawls 68, which not being capable of yielding to pressure applied in that direction necessarily causes the disks 61 to rotate in a downward direction toward the fixed heading-die, thereby actuating the threaded stems 62, so as to unlock and release the spike from the pressure of the gripping-dies. The movable heading-die 42 remains engaged in the carrier 37 during a portion of its return movement, or until the sliding movement of the supporting-arms 43 is arrested by the engagement of the pins 45 and slots 46, at which time the carrier and its gripping-dies commence to draw off from the die 42 and from the finished spike on the under side thereof, and said spike, being thus deprived of support, is permitted to fall to the floor, or into any suitable receptacle placed beneath the machine. Then, as the holder or carrier 37 passes on toward the feeding, pointing, and rolling mechanism, the disks 61 press against the inner sides of the pawls 68 nearest said mechanism, thereby raising said pawls sufficiently to pass beneath, the pawls being immediately pressed down again, by means of their springs 76, in position for rotating the disks to lock the gripping-dies on the next movement of the carrier. As soon as the carrier 37 is brought into sufficiently close contact with the rolling and feeding mechanism, a fresh blank is seized, locked, conveyed to the heading mechanism, and made into a finished spike, as already described.

It will be observed that the necessary steps of feeding, cutting, pointing, and rolling the spike-blanks and forming them with tapered shanks and hooked heads are accomplished successively by a continuous operation of the machine, during which suitable provision is made for ejecting imperfectly-headed spikes and short lengths of spike-rod, and also for lubricating and cooling the dies by a free use of water, so as to obviate sticking and undue wear.

All parts of the machine subjected to great pressure and wear are made of tempered or hardened steel and arranged so as to be detachable for removal or repairs, and the various operative parts are so adjusted and combined as to be capable of performing their several functions in the most satisfactory manner.

What I claim as my invention is—

1. In a spike-making machine, the combination, with the feeding, rolling, and pointing mechanism and the reciprocating die-holder and blank-carrier, of a combined guide-block and clearer cored on its upper and lower sides, to admit the peripheries of the feeding and pointing rolls, and having a pivoted dog at its discharge end in the path of the spike-blank, substantially as described.

2. In a spike-making machine, the combination, with a reciprocating die-holder and blank-carrier having laterally-movable gripping-dies seated therein, and provided with tubular internally-threaded trunnions and transverse tubular passages, of ratchet-disks having screw-shanks to enter and engage said trunnions, push-rods seated at one end in the sides of the gripping-dies and at the other end in rings inserted in said ratchet-disks, and pawls for engaging said disks to lock the gripping-dies in contact with a spike-blank and to release the same, substantially as described.

3. In a spike-making machine, the combination, with a reciprocating die-holder and blank-carrier having gripping-dies seated therein, and a pair of oppositely-flanged feeding and pointing rolls, of shouldered journal-boxes adapted to hold the said rolls out of bearing contact with each other, and a guide-block placed between said boxes and cored on its upper and lower sides, to receive the peripheries of the rolls, said guide-block being adapted to receive, support, and guide the spike-blanks under the rolling, cutting, and pointing action of the rolling mechanism and deliver them to the reciprocating carrier, substantially as described.

4. In a spike-making machine, the combination, with a stationary heading-die and a reciprocating die-holder and blank-carrier having laterally-movable gripping-dies, of a movable heading-die having slotted supporting-arms adapted to slide in grooves formed in the sides of an abutment which supports the stationary heading-die, stop-pins for engaging said slotted arms, gear-wheels having cams for bearing on the ends of said arms, and links for connecting said gears with the reciprocating die-holder and blank-carrier, substantially as described.

5. In a spike-making machine, the combination, with the reciprocating die-holder and blank-carrier and the stationary and movable heading-dies, of a pivoted vertically-inclined bar for imparting a preparatory bend to the head end of the spike-blank, an oscillatory arm for supporting said bar, and a cam for actuating said arm, substantially as described.

6. In a spike-making machine, the combination, with a reciprocating die-holder and blank-carrier having an interior water way or chamber for the circulation of a cooling or lubricating medium, and a transverse tubular passage extending through said chamber, of laterally-movable gripping-dies located immediately above and in contact with the central open portion of said chamber, push-rods inserted in the transverse tubular passageway and engaging the gripping-dies on each side, ratchet-disks for actuating said push-rods, said disks being provided with screw-shanks that enter internally-threaded openings communicating with the water-way, and pawls for actuating said disks, substantially as described.

7. In a spike-making machine, the combination, with a hollow reciprocating die-holder and blank-carrier having tubular internally-threaded trunnions and transverse tubular passages communicating with its hollow interior, of a detachable die-bed keyed into said holder or carrier, laterally-movable gripping-dies overlapping said bed and keyed from longitudinal movement, push-rods located in the transverse tubular passages and adapted to actuate said gripping-dies, and pawls and ratchet-disks for actuating said push-rods, said disks having threaded shanks engaged in the carrier-trunnions for locking the gripping-dies, substantially as described.

8. In a spike-making machine, the combination of the flanged rolls 7, having cutting and pointing teeth or dies, the guide-block 14, having a longitudinal passage for the spike-blank, and cored to receive the peripheries of the feeding, cutting, and pointing rolls, the dog 89, pivoted to the discharge end of said guide-block in the path of the spike-blank, and the reciprocating die-holder and blank-carrier 37, having gripping-dies for seizing said blank, substantially as described.

9. In a spike-making machine, the combination of the flanged rolls 7, the shaft 6, having wear-sleeves 11 and wear-collar 16, the shouldered boxes 10, the cored guide-block 14, and means, as specified, for imparting a lateral adjustment to the rolls, substantially as described.

10. In a spike-making machine, the combination of a feeding, rolling, cutting, and pointing mechanism, a reciprocating die-holder and blank-carrier, 37, having gripping-dies, a stationary heading-die, 40, a movable heading-die, 42, and the pivoted vertically-inclined bar 84, adapted to impart a bend to the head end of the blank prior to the action of the heading-dies, substantially as described.

11. In a spike-making machine, the combination of the recessed die-holder and blank-carrier 37, having a chamber or passages, 49, for the circulation of a cooling and lubricating medium, the detachable die-bed 53, keyed into said holder or carrier, and the laterally-movable gripping-dies 51, overlapping said die-bed, and provided on their under sides with projections 54, adapted to engage recesses on each side of the die-bed, whereby said dies are held from longitudinal movement, said projections being located immediately above the open lubricating or cooling chamber, substantially as described.

12. In a spike-making machine, the combination of the reciprocating die-holder and blank-carrier 37, having tubular internally-threaded trunnions 36 and transverse passages 57, the laterally-movable gripping-dies 51, push-rods 56, rings 59, having elongated notches 64, the recessed disks 61, having threaded stems 62, stop-pins 65, and ratchet projections 67, and the pawls 68, for actuating said disks, substantially as described.

13. In a spike-making machine, the combination of the reciprocating die-holder and blank-carrier 37, having laterally-movable gripping-dies 51, push-rods 56, for actuating the same, and internally-threaded trunnions 36, the ratchet-disks 61, having screw-stems 62, the pawls 68, having flanges 71 and lugs 77, the rings 72, provided with springs 76, and the washer 73, substantially as described.

14. In a spike-making machine, the combination of the abutment 41, having guideways 44 and stop-pins 45, the stationary heading-die 40, supported by said abutment, the movable heading-die 42, provided with horizontal supporting-arms 43, adapted to slide in the guideways 44, and having slots 46, for engaging the stop pins 45, the reciprocating die-holder and blank carrier 37, the gear-wheels 31, having cams 47 and 48, for acting on the arms of the movable heading-die, and the links 34, for connecting said gears with the die-holder and blank-carrier, substantially as described.

15. In a spike-making machine, the combination of the feeding, cutting, and pointing rolls 7, the cored guide-block 14, having a clearing-dog, 89, at its discharge end in the path of the spike-blank, a reciprocating die-holder and blank-carrier, 37, a stationary heading-die, 40, the movable heading-die 42, having horizontal supporting-arms 43, the wheels 31, having cams for acting on said die-supporting arms, the links 34, for connecting said wheels with the reciprocating die-holder and blank-carrier, and the cam-actuated bar 84, for imparting a preparatory bend to the head end of the spike-blank immediately before the action of the heading dies, substantially as described.

In testimony whereof I affix my signature in presence of two witnesses.

JOHN NORTH.

Witnesses:
Jos. L. Coombs,
J. A. Rutherford.